L. STERNE.
NUT-LOCK.

No. 185,979.  Patented Jan. 2, 1877.

Attest:
H. L. Perrine
W. L. Coombs

Louis Sterne,
Inventor

James L. Norris,
Attorney

UNITED STATES PATENT OFFICE.

LOUIS STERNE, OF LONDON, ENGLAND.

IMPROVEMENT IN NUT-LOCKS.

Specification forming part of Letters Patent No. 185,979, dated January 2, 1877; application filed June 30, 1876.

*To all whom it may concern:*

Be it known that I, LOUIS STERNE, of London, England, have invented certain Improvements in Nut-Locks, of which the following is a specification:

This invention relates to certain improvements in nut-locks; and the present invention consists of a washer having an inclined face, and at one or two of its opposite edges a flange or lug, the said washer being arranged behind the nut on the screw-threaded bolt, in such manner that said washer will turn with the nut when screwed onto the bolt, so that the screwing home of the nut carries the washer and bends the bolt out of its normal position, and, in addition to the aforesaid flange or flanges on its edge, makes the nut secure, all of which will be more fully hereinafter described.

Figure 1:
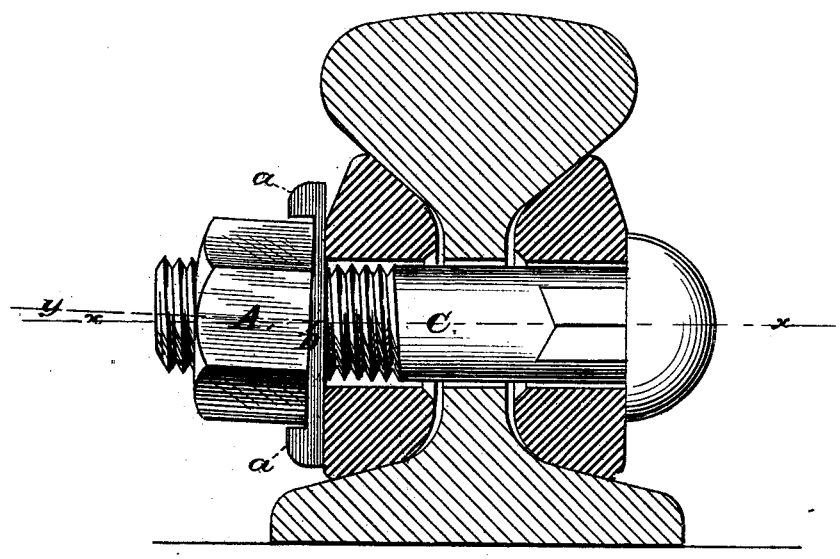
Figure 2:
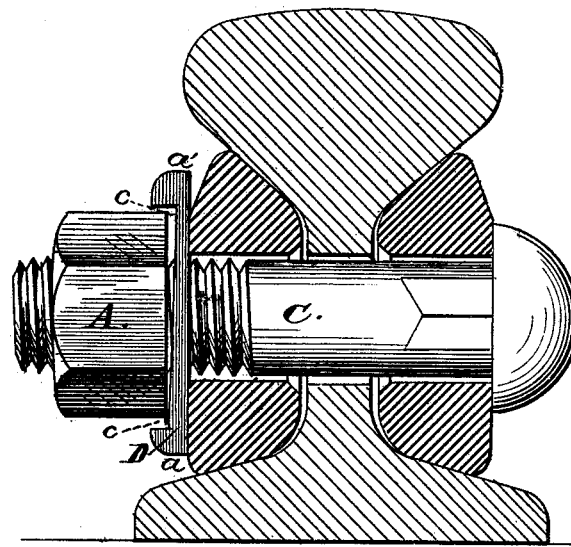

In the accompanying drawings, Figure 1 represents my invention applied to railroad-rails for fastening the bolt in position, the bolt being slightly bent; and Fig. 2, a similar view, the nut just commencing to act on the washer to bend the bolt.

In the accompanying drawing, C represents an ordinary screw-bolt, and A the nut, both applied, in the present instance, to railroad-rails, for securing the fish-plates in position. D represents my improved metallic washer, which is interposed between the nut and fish-plate, the said washer being cast or constructed at opposite edges with flanges *a a*, which engage with or are caught by the inner edge of the nut, and turn with the same when it is screwed home. The outer face *c* of this washer is inclined to the inner face, which comes against the fish-plate, and when the nut is screwed it carries and turns with it the said washer, and, being forced in contact with the inclined bearing-face, will cause the bolt to be bent out of its normal position, and the nut will be thereby held securely in position.

I do not claim, broadly, an inclined washer interposed behind the nut, as such is not my invention, which consists in providing the inclined face with flanges, so that it will turn with the nut when the latter is screwed home.

Having thus described my invention, what I claim, and desire to secure by Letters Patent, is—

The combination, in a nut and bolt fastening, of the bolt C, the nut A, and the washer D, having an inclined face, *c*, and flanges *a a* at its edge, so that it will turn with the nut when screwed home, substantially as described.

In witness whereof I, the said LOUIS STERNE, have hereunto set my hand this fifteenth day of December, one thousand eight hundred and seventy-five.

L. STERNE.

Witnesses:
G. F. WARREN,
WILMER M. HARRIS.